US012257906B2

(12) United States Patent
Katoh (10) Patent No.: US 12,257,906 B2
(45) Date of Patent: Mar. 25, 2025

(54) VEHICLE POWER SUPPLY DEVICE AND VEHICLE POWER SUPPLY METHOD

(71) Applicant: TOYOTA JIDOSHA KABUSHIKI KAISHA, Toyota (JP)

(72) Inventor: Satoru Katoh, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/503,536

(22) Filed: Nov. 7, 2023

(65) Prior Publication Data

US 2024/0262208 A1 Aug. 8, 2024

(30) Foreign Application Priority Data

Feb. 6, 2023 (JP) ................. 2023-016176

(51) Int. Cl.
*H02P 27/08* (2006.01)
*B60L 3/00* (2019.01)
*B60L 15/00* (2006.01)
*B60L 50/13* (2019.01)
*H02M 1/32* (2007.01)
*H02M 7/483* (2007.01)
*H02M 7/5387* (2007.01)

(52) U.S. Cl.
CPC ............ *B60L 3/003* (2013.01); *B60L 15/007* (2013.01); *B60L 50/13* (2019.02); *H02M 1/327* (2021.05); *H02M 7/4833* (2021.05); *H02M 7/53873* (2013.01); *B60L 2240/421* (2013.01); *B60L 2240/525* (2013.01); *H02M 1/322* (2021.05)

(58) Field of Classification Search
CPC ............ B60L 3/00; B60L 15/00; B60L 50/13; H02M 1/32; H02M 7/483; H02M 7/5387
See application file for complete search history.

(56) References Cited

U.S. PATENT DOCUMENTS

| 2017/0021733 A1* | 1/2017 | Kondou | ............... H03K 17/145 |
| 2018/0264958 A1* | 9/2018 | Okada | ...................... H02P 27/06 |
| 2019/0006885 A1* | 1/2019 | Danilovic | ............ H02H 7/1252 |
| 2024/0171111 A1* | 5/2024 | Alvi | ...................... H02P 29/028 |

FOREIGN PATENT DOCUMENTS

JP 2019-193512 A 10/2019

* cited by examiner

*Primary Examiner* — Jared Fureman
*Assistant Examiner* — Esayas G Yeshaw
(74) *Attorney, Agent, or Firm* — SoraIP, Inc.

(57) ABSTRACT

When the voltage value of the capacitor included in the PCU is equal to or higher than a predetermined value, the vehicle power supply device turns on both the positive switching element and the negative switching element corresponding to one of a plurality of resistors so as to activate the one resistor connected to the initially disabled PCU. In addition, the vehicle power supply device turns on both the positive switching element and the negative switching element corresponding the other one of the resistors so as to deactivate the one resistor and activate the other one resistor based on a predetermined condition.

5 Claims, 6 Drawing Sheets

FIG. 1

1: VEHICLE POWER SUPPLY DEVICE

FIG. 2

|  | TARGET RESISTOR | SWITCHING ELEMENT | | | | | |
|---|---|---|---|---|---|---|---|
|  |  | 21 | 22 | 23 | 24 | 25 | 26 |
| CASE (A) | FIRST RESISTOR | ON | OFF | OFF | ON | OFF | OFF |
| CASE (B) | SECOND RESISTOR | OFF | OFF | ON | OFF | OFF | ON |
| CASE (C) | 3RD RESISTOR | OFF | ON | OFF | OFF | ON | OFF |

FIG. 6

VEHICLE POWER SUPPLY DEVICE AND VEHICLE POWER SUPPLY METHOD

CROSS-REFERENCE TO RELATED APPLICATION

This application claims priority to Japanese Patent Application No. 2023-016176 filed on Feb. 6, 2023, incorporated herein by reference in its entirety.

BACKGROUND

1. Technical Field

The present disclosure relates to a vehicle power supply device and a vehicle power supply method.

2. Description of Related Art

Japanese Unexamined Patent Application Publication No. 2019-193512 (JP 2019-193512 A) discloses a hydroelectric grid interconnection system using a general-purpose power conditioner (PCS). The hydroelectric grid interconnection system includes a generator that converts rotational energy of a turbine into electrical energy, a rectifier that converts electric power generated by the generator into direct current power, and a control device that controls the rotation speed of the turbine by adjusting a load on the generator. In this technology, when overvoltage occurs due to high-speed rotation of the turbine or the like, the switch function of the rectifier is controlled to OFF. As a result, the generator and the PCS are separated from each other so as not to consume the generated electric power. Overvoltage power generated by the high-speed rotation of the turbine or the like is absorbed by a consumption resistor device.

SUMMARY

In the vehicle power supply device, it is necessary to assume that an abnormality may occur in a system between the PCS connected to a power control unit (PCU) and the generator. When the rotation speed of an external device (motor) connected to the generator is equal to or higher than a permissible rotation speed, energy is consumed by causing a current to flow through a resistor connected to the PCU. Therefore, it is possible to reduce the occurrence of a case where the rotation speed of the motor reaches the permissible rotation speed or higher. When a current equal to or larger than a predetermined value is continuously applied to the resistor, however, the temperature of an inverter connected to the resistor reaches a permissible temperature or higher, which may cause failure of the inverter.

One object of the present disclosure is to provide a technology for protecting an inverter inside a PCU while consuming energy so as not to impose a load on an external device connected to the PCU when a system abnormality occurs in the PCU in a vehicle.

A first aspect of the present disclosure relates to a vehicle power supply device. The vehicle power supply device includes a power control unit and a plurality of resistors connected to the power control unit. The power control unit includes: a capacitor; a voltage sensor configured to measure a voltage of the capacitor; a three-phase inverter connected in parallel with the capacitor; and a control device connected to the voltage sensor and the three-phase inverter. A positive terminal of each of the resistors is connected to a positive power line via any one of a plurality of positive switching elements provided on a positive side of individual phases of the three-phase inverter. A negative terminal of each of the resistors is connected to a negative power line via any one of a plurality of negative switching elements provided on a negative side of the individual phases of the three-phase inverter. The negative terminal is connected to the negative power line via the negative switching element of one of two phases different from a phase in which the positive switching element connected to the positive terminal is provided. The control device is configured to turn ON both the positive switching element and the negative switching element associated with one resistor out of the plurality of resistors disabled in an initial state to enable the one resistor when a voltage value of the voltage sensor is equal to or larger than a predetermined value. The control device is configured to disable the one resistor and turn ON both the positive switching element and the negative switching element associated with one other resistor out of the plurality of resistors to enable the one other resistor when a predetermined condition is satisfied.

A second aspect of the present disclosure relates to a vehicle power supply method. The vehicle power supply method includes: turning ON both a positive switching element and a negative switching element associated with one resistor out of a plurality of resistors disabled in an initial state and connected to a power control unit to enable the one resistor when a voltage value of a capacitor of the power control unit is equal to or larger than a predetermined value; and disabling the one resistor and turning ON both a positive switching element and a negative switching element associated with one other resistor out of the plurality of resistors to enable the one other resistor based on a predetermined condition.

According to the present disclosure, when a voltage abnormality that is an example of a system abnormality of the PCU is detected, one resistor out of the plurality of resistors is switched and enabled. Therefore, it is possible to suppress an increase in the temperature of the inverter while consuming energy so as not to impose a load on the external device connected to the PCU. Thus, it is possible to avoid the failure of the inverter.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle power supply device and a vehicle power supply method according to an embodiment of the present disclosure will be described with reference to the accompanying drawings. Elements common to each drawing are assigned the same reference numerals, and overlapping descriptions are omitted.

1. Configuration Example

Figure 1:
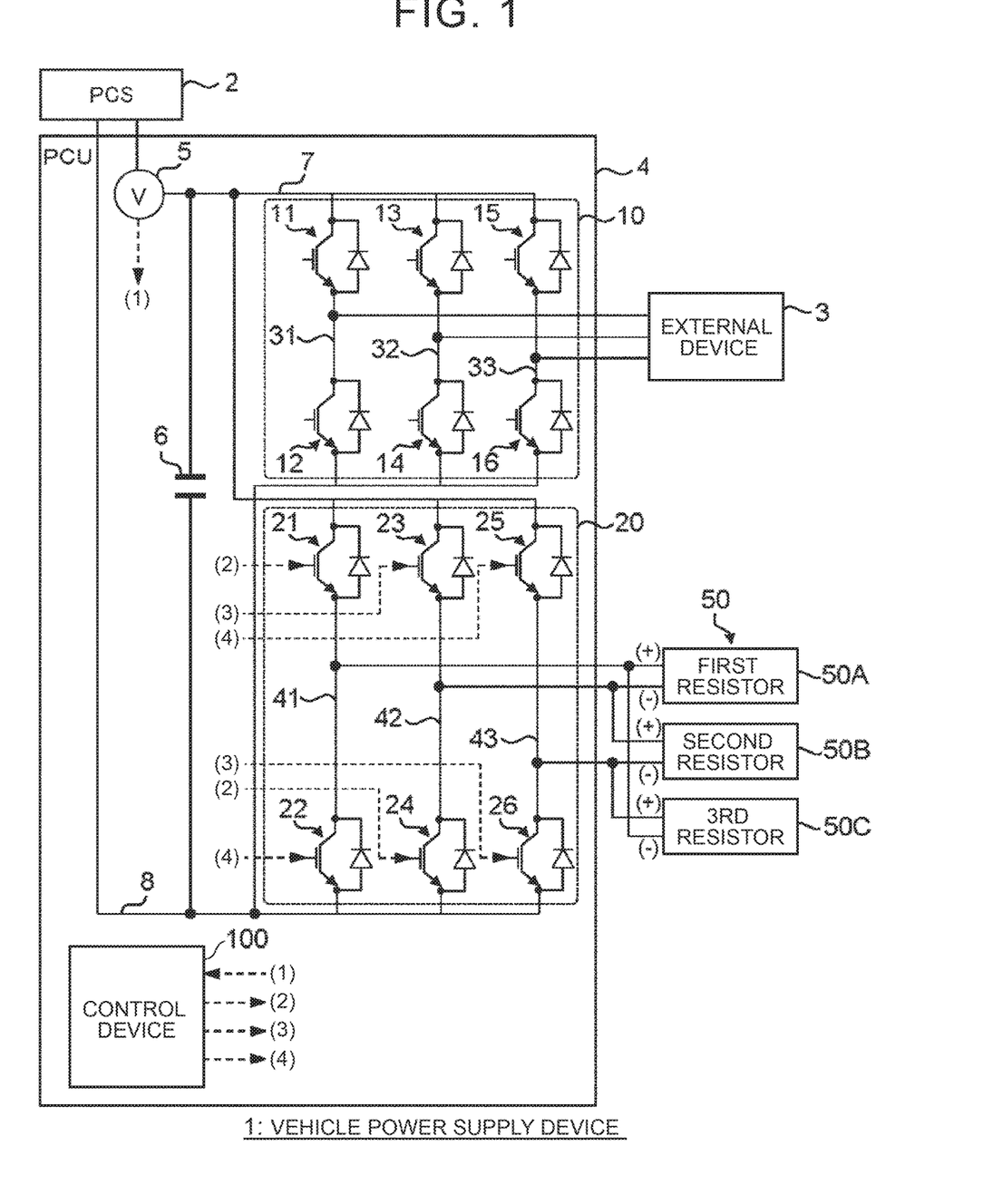
FIG. 1 is a block diagram showing a configuration example of a vehicle power supply device according to an embodiment.

FIG. 1 is a block diagram showing a configuration example of a vehicle power supply device 1 according to an embodiment. A vehicle power supply device 1 is mounted on a vehicle and used to supply electric power for use in the vehicle. However, the vehicle power supply device 1 may be used as a power generation system for supplying electric power to the outside of the vehicle. A vehicle equipped with the vehicle power supply device 1 may be a manually operated vehicle or an automatically operated vehicle.

As shown in FIG. 1, the vehicle power supply device 1 includes a PCS 2, a PCU 4, an external device 3, and a plurality of resistors 50. One side of the PCS 2 is connected to the positive power line 7 and the other side is connected to the negative power line 8. PCU 4 is connected to PCS 2, external device 3 and a plurality of resistors 50. The PCS 2 is a device that has a function of converting electric power obtained from a commercial power source, solar power generation, or the like into electric power that can be used by a vehicle or the like. PCU 4 is a power conversion device that converts power to and from PCS 2. The external device 3 is a generator, a motor, or the like. The plurality of resistors 50 includes a first resistor 50A, a second resistor 50B and a third resistor 50C. The first resistor 50A, the second resistor 50B, and the third resistor 50C are resistors that absorb (consume) energy when the power in the system between the PCS 2 and the PCU 4 is overvoltage power. Incidentally, the negative power line 8 described above is energized to the ground (not shown).

The PCU 4 includes a capacitor 6, a first inverter 10, a second inverter 20, a voltage sensor 5 and a control device 100.

One side of the capacitor 6 is connected to the positive power line 7 and the other side is connected to the negative power line 8. The capacitor 6 is a component that smooths the DC voltage input from the PCS 2 and charges and discharges energy.

The first inverter 10 is connected in parallel with the capacitor 6. Specifically, the first inverter 10 has one side connected to the positive power line 7 and the other side connected to the negative power line 8. Also, the second inverter 20 is connected in parallel with the capacitor 6. As with the first inverter 10, the second inverter 20 also has one end connected to the positive power line 7 and the other end connected to the negative power line 8. The first inverter 10 and the second inverter 20 are devices that convert a DC voltage input to the PCU 4 into an AC voltage of any voltage and frequency and output the AC voltage. Examples of the first inverter 10 and the second inverter 20 include a three-phase inverter (three-level inverter) that generates and outputs three-phase power. An Intelligent Power Module (IPM) is exemplified as a three-level inverter.

The first inverter 10 includes a plurality of positive switching elements provided on the positive side of each phase and a plurality of negative switching elements provided on the negative side of each phase. The plurality of positive switching elements are a first positive switching element (first switching element 11) provided in a first phase (one phase) and a second positive switching element provided in a second phase (two phases). (third switching element 13) and a third positive switching element (fifth switching element 15) provided in the third phase (three phases). The plurality of negative switching elements includes a first negative switching element (second switching element 12) provided in one phase, a second negative switching element (fourth switching element 14) provided in two phases, and a third negative switching element (sixth switching element 16) provided in three phases.

One side of the first switching element 11 is connected to the positive power line 7 and the other side is connected to the first power line 31. The second switching element 12 has one end connected to the first power line 31 and the other end connected to the negative power line 8. The third switching element 13 has one end connected to the positive power line 7 and the other end connected to the second power line 32. The fourth switching element 14 has one end connected to the second power line 32 and the other end connected to the negative power line 8. The fifth switching element 15 has one end connected to the positive power line 7 and the other end connected to the third power line 33. The sixth switching element 16 has one end connected to the third power line 33 and the other end connected to the negative power line 8. The external device 3 described above is connected to the first power line 31, the second power line 32 and the third power line 33. Thereby, the external device 3 is driven in three phases.

The second inverter 20 includes a plurality of positive switching elements provided on the positive side of each phase and a plurality of negative switching elements provided on the negative side of each phase. The plurality of positive switching elements include a first switching element 21 provided for one phase, a third switching element 23 provided for two phases, and a fifth switching element 25 provided for three phases. The plurality of negative switching elements includes a second switching element 22 provided for one phase, a fourth switching element 24 provided for two phases, and a sixth switching element 26 provided for three phases.

One side of the first switching element 21 is connected to the positive power line 7 and the other side is connected to the first power line 41. The second switching element 22 has one end connected to the first power line 41 and the other end connected to the negative power line 8. One side of the third switching element 23 is connected to the positive power line 7 and the other side is connected to the second power line 42. The fourth switching element 24 has one end connected to the second power line 42 and the other end connected to the negative power line 8. The fifth switching element 25 has one end connected to the positive power line 7 and the other end connected to the third power line 43. The sixth switching element 26 has one end connected to the third power line 43 and the other end connected to the negative power line 8.

Based on the configuration of the second inverter 20, the above-described first resistor 50A, second resistor 50B, and third resistor 50C are connected as follows. Each of the first resistor 50A, the second resistor 50B, and the third resistor 50C is a resistor having a positive terminal (+) and a negative terminal (−).

A positive terminal (+) of the first resistor 50A is connected to the first power line 41, and a negative terminal (−) of the first resistor 50A is connected to the second power line 42. A positive terminal (+) of the second resistor 50B is connected to the second power line 42, and a negative terminal (−) of the second resistor 50B is connected to the third power line 43. A positive terminal (+) of the third resistor 50C is connected to the third power line 43, and a negative terminal (−) of the third resistor 50C is connected to the first power line 41.

That is, the positive terminal (+) of each of the plurality of resistors 50 is connected to the positive power line 7 via any one of the plurality of positive switching elements provided on the positive side of each phase of the second inverter 20. Further, the negative terminal (−) of each of the plurality of resistors 50 is connected to the negative power line 8 via any one of the plurality of negative switching elements provided on the negative side of each phase of the second inverter 20. The negative terminal is connected to the negative power line 8 via the negative switching element of either one of the two phases different from the phase in which the positive switching element connected to the positive terminal is provided.

Voltage sensor 5 is connected to positive power line 7. The voltage sensor 5 is a sensor that measures the voltage value of the system between the PCS 2 and the external device 3.

The control device 100 is a computer that controls the vehicle power supply device 1. The control device 100 may be mounted inside the PCU 4 or may be provided outside the PCU 4. The control device 100 is, for example, an Electronic Control Unit (ECU), and includes a processor (not shown) and a memory (not shown) storing a control program (control program according to the present embodiment) executed by the processor. The functions described below are realized in the control device 100 by executing the control program in the processor.

The control device 100 is connected to at least the voltage sensor 5 and the second inverter 20. Specifically, the control device 100 is connected to the first switching element 21, the second switching element 22, the third switching element 23, the fourth switching element 24, the fifth switching element 25, and the sixth switching element 26 in the second inverter 20.

Based on the voltage value information acquired from the voltage sensor 5, the control device 100 determines whether the voltage value is equal to or greater than a predetermined value (that is, the voltage is abnormal). Further, when it is determined that the voltage value is abnormal, the control device 100 controls ON/OFF switching of each switching element. In other words, the control device 100 keeps all the switching elements OFF when no voltage abnormality is detected. As a result, when the system between the PCS 2 and the external device 3 is normal, the connection between the second inverter 20 and the resistor 50 is cut off so that the power charged in the capacitor 6 is not consumed by the resistor 50.

2. Concrete Example 2-1. Overview of Resistor Switching Example

Here, ON/OFF switching control of each switching element when a voltage abnormality occurs in the system between the PCS 2 and the external device 3 is considered. In order to prevent the positive power line 7 and the negative power line 8 from being short-circuited, the first switching element 21 and the second switching element 22 of one phase cannot be turned ON at the same time. In addition, the two-phase third switching element 23 and fourth switching element 24 cannot be turned ON at the same time. Furthermore, the three-phase fifth switching element 25 and sixth switching element 26 cannot be turned on at the same time. Therefore, all of the first resistor 50A, the second resistor 50B, and the third resistor 50C cannot be enabled at the same time as the target resistors 50 to be enabled when a voltage abnormality occurs in the system between the PCS 2 and the external device 3. Also, any two of the second resistor 50B and the third resistor 50C cannot be turned ON at the same time. The target resistor 50 is only one of the first resistor 50A, the second resistor 50B, and the third resistor 50C. Hereinafter, an example of ON/OFF switching of each switching element corresponding to the target resistor 50 will be described in detail.

Figure 2:
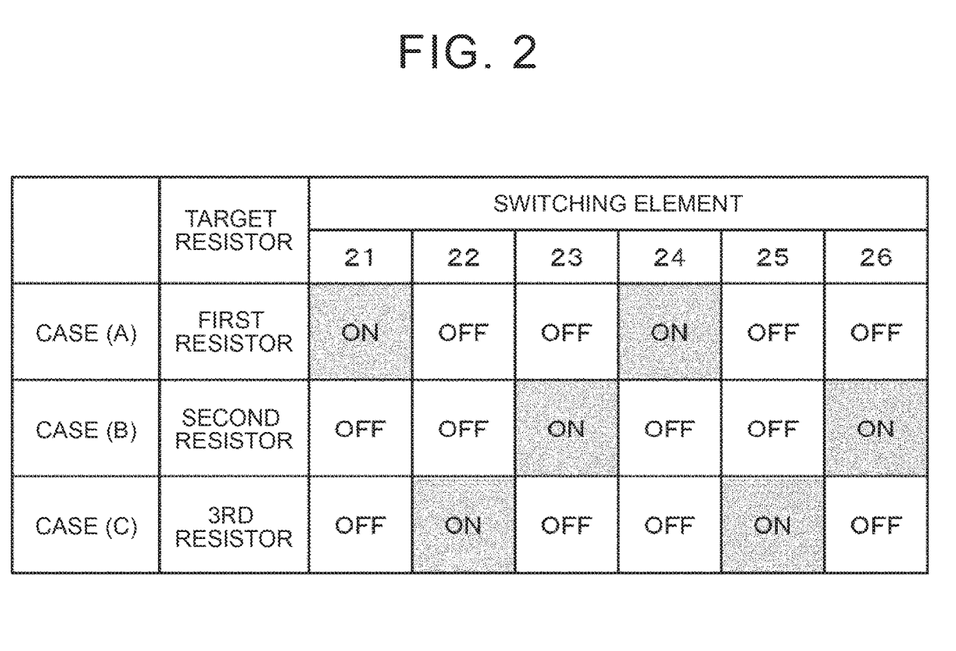
FIG. 2 is an explanatory diagram showing a specific example of the vehicle power supply device according to the embodiment.

FIG. 2 is an explanatory diagram showing a specific example of the vehicle power supply device 1 according to the embodiment. Specifically, FIG. 2 is a diagram showing an example of ON/OFF switching of each switching element of the second inverter 20 corresponding to the target resistor 50. For example, as shown in case (A) of FIG. 2, when the target resistor 50 is the first resistor 50A, the control device 100 turns ON only the first switching element 21 and the fourth switching element 24. Further, as shown in case (B) of FIG. 2, when the target resistor 50 is the second resistor 50B, the control device 100 turns ON only the third switching element 23 and the sixth switching element 26. Furthermore, as shown in case (C) of FIG. 2, when the target resistor 50 is the third resistor 50C, the control device 100 turns ON only the second switching element 22 and the fifth switching element 25. Thereby, the target resistor 50 can be enabled without short-circuiting the positive power line 7 and the negative power line 8.

Based on this, the temperature transition of the switching element in the second inverter 20 when the target resistor 50 is enabled will be considered.

Figure 3:
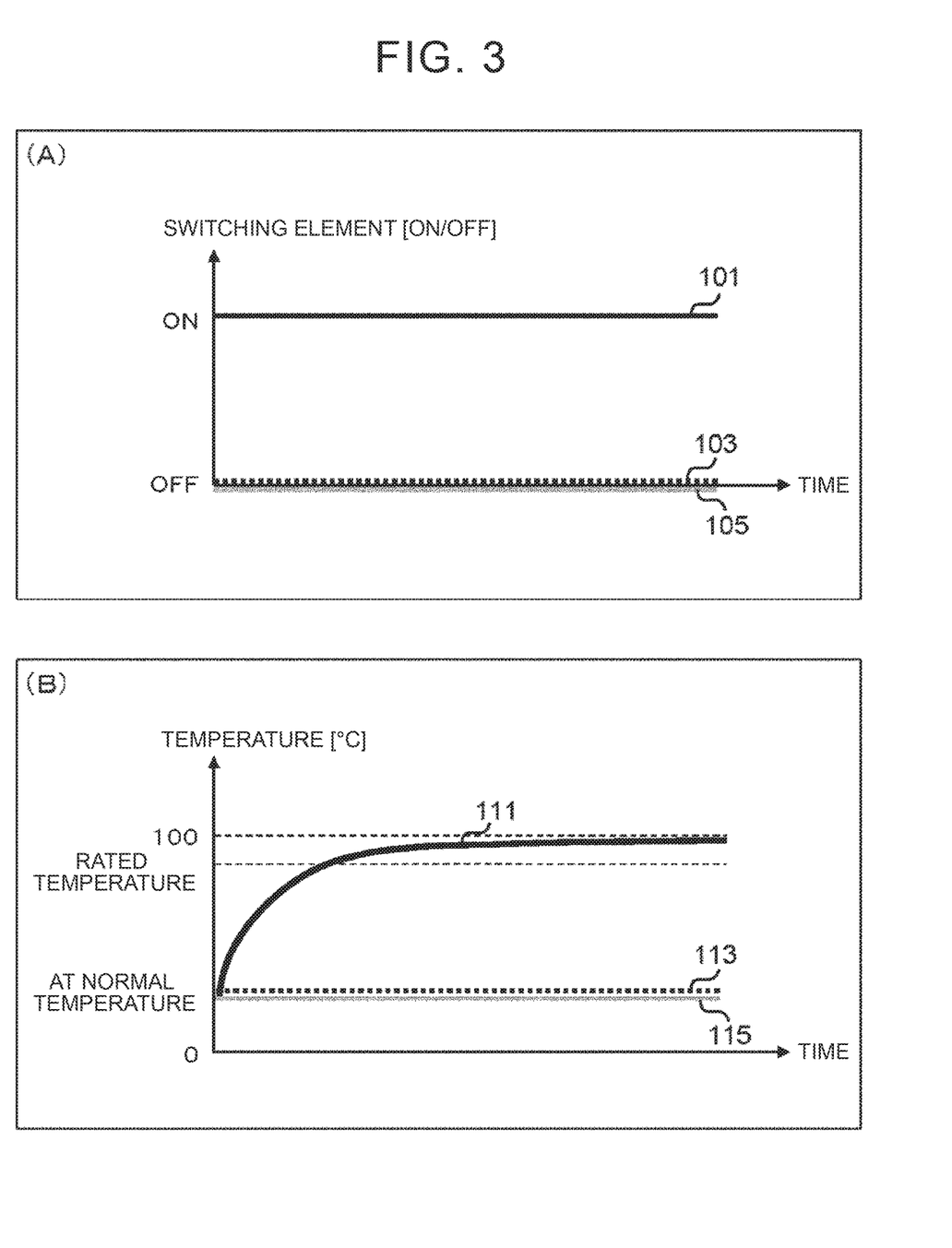
FIG. 3 is an explanatory diagram showing a comparative example of the vehicle power supply device according to the embodiment.

FIG. 3 is an explanatory diagram showing a comparative example of the vehicle power supply device 1 according to the embodiment. Specifically, FIG. 3 is a diagram showing an example of temperature transition of a switching element corresponding to the positive terminal (+) of the target resistor 50 when one of the first resistor 50A, the second resistor 50B, and the third resistor 50C is used as the target resistor 50.

Case (A) in FIG. 3 shows the ON/OFF switching state of the switching element corresponding to the positive terminal (+) of the resistor 50. Specifically, the first switch waveform 101 is a waveform that indicates the ON/OFF switching state of the first switching element 21 corresponding to the positive terminal (+) of the first resistor 50A. The ON/OFF switching state of the fourth switching element 24 corresponding to the negative terminal (−) of the first resistor 50A is also represented by the first switch waveform 101. A third switch waveform 103 is a waveform that indicates the ON/OFF switching state of the third switching element 23 corresponding to the positive terminal (+) of the second resistor 50B. The ON/OFF switching state of the sixth switching element 26 corresponding to the negative terminal (−) of the second resistor 50B is also represented by the third switch waveform 103. Furthermore, the fifth switch waveform 105 is a waveform that indicates the ON/OFF switching state of the fifth switching element 25 corresponding to the positive terminal (+) of the third resistor 50C. The fifth switch waveform 105 also represents the ON/OFF switching state of the second switching element 22 corresponding to the negative terminal (−) of the third resistor 50C.

For example, when the target resistor 50 is the first resistor 50A, as shown in case (A) of FIG. 3, the first switch waveform 101 corresponding to the first resistor 50A is an ON waveform. On the other hand, the third switch waveform 103 corresponding to the second resistor 50B that is not used as the target resistor 50 is an OFF waveform. Also, the fifth switch waveform 105 corresponding to the third resistor 50C, which is not used as the target resistor 50, is an OFF waveform.

Next, when the target resistor 50 is the first resistor 50A, temperature transitions of the first switching element 21 and the fourth switching element 24 corresponding to the first resistor 50A are considered.

Case (B) in FIG. 3 shows the temperature state of the switching element corresponding to the positive terminal (+) of the resistor 50. Specifically, the first temperature waveform 111 is a waveform that indicates the temperature state of the first switching element 21 corresponding to the positive terminal (+) of the first resistor 50A. A third temperature waveform 113 is a waveform that indicates the temperature state of the third switching element 23 corresponding to the positive terminal (+) of the second resistor 50B. Furthermore, the fifth temperature waveform 115 is a waveform that indicates the temperature state of the fifth switching element 25 corresponding to the positive terminal (+) of the third resistor 50C.

As shown in case (B) of FIG. 3, the first temperature waveform 111 is a waveform that rises to a temperature close to 100° C., which exceeds the rated temperature. That is, it can be said that the temperature of the first switching element 21 corresponding to the positive terminal (+) of the first resistor 50A used as the target resistor 50 rises to a temperature close to 100° C. On the other hand, both the third temperature waveform 113 and the fifth temperature waveform 115 are waveforms that maintain about normal temperature below the rated temperature. This is because it is not used as the target resistor 50 and both the third switching element 23 and the fifth switching element 25 are in a non-operating state.

As shown in case (B) of FIG. 3, when the temperature of the first temperature waveform 111 exceeds the rated temperature of the first switching element 21, the first switching element 21 may fail. The same applies to the fourth switching element 24 corresponding to the negative terminal (-) of the first resistor 50A. Therefore, when trying to absorb abnormal power when a voltage abnormality occurs using the resistor 50, temperature control is required so that the temperature of the switching element corresponding to the target resistor 50 does not exceed the rated temperature.

According to the vehicle power supply device 1 according to the embodiment, the target resistor 50 is switched such that the temperature of the switching element corresponding to the target resistor 50 is lower than the predetermined temperature lower than the rated temperature. Two examples of switching the target resistor 50 will be described in detail below.

2-2. First Switching Example of Resistor

Figure 4:
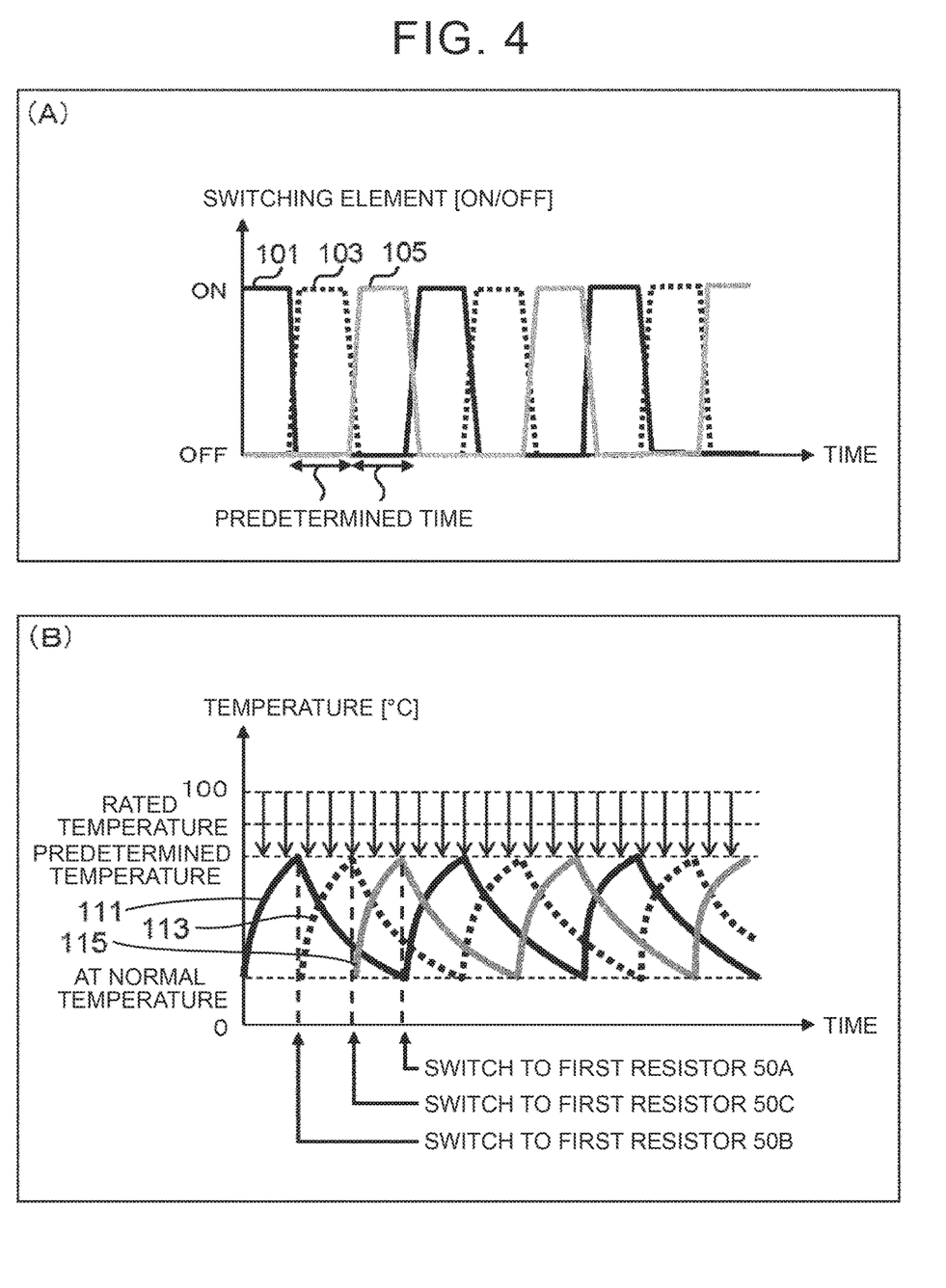
FIG. 4 is an explanatory diagram showing a specific example of the vehicle power supply device according to the embodiment.

FIG. 4 is an explanatory diagram showing a specific example of the vehicle power supply device 1 according to the embodiment. Specifically, case (A) in FIG. 4 shows an example in which the target resistor 50 is switched at predetermined time intervals. For example, consider switching the target resistor 50 in order of the first resistor 50A, the second resistor 50B, and the third resistor 50C. First, the control device 100 sets the target resistor 50 to the first resistor 50A. That is, one resistor 50 out of the plurality of resistors 50 is set. In this case, the first switch waveform 101 is an ON waveform. On the other hand, the third switch waveform 103 and the fifth switch waveform 105 are both OFF waveforms.

Subsequently, as shown in case (A) of FIG. 4, after a predetermined time has passed since the target resistor 50 was set to the first resistor 50A, the control device 100 switches the target resistor 50 from the first resistor 50A to the second resistor 50B. That is, one resistor 50 other than the one resistor 50 described above is set among the plurality of resistors 50. In this case, the third switch waveform 103 is an ON waveform, and both the first switch waveform 101 and the fifth switch waveform 105 are OFF waveforms. The predetermined time may be, for example, a time determined during evaluation such that the maximum temperature of the switching element corresponding to the target resistor 50 is below a predetermined temperature that is lower than the rated temperature.

Furthermore, as shown in case (A) of FIG. 4, after a predetermined time has passed since the target resistor 50 was switched to the second resistor 50B, the control device 100 switches the target resistor 50 from the second resistor 50B to the third resistor 50C. That is, one resistor 50 other than the two resistors 50 described above is set among the plurality of resistors 50. In this case, the fifth switch waveform 105 is an ON waveform, and both the first switch waveform 101 and the third switch waveform 103 are OFF waveforms.

Thereafter, the operation of switching the target resistor 50 in order of the first resistor 50A, the second resistor 50B, and the third resistor 50C is repeatedly performed. After that, when the voltage abnormality is resolved, the control device 100 cuts off the connection between the second inverter 20 and the resistor 50.

Thus, in the first switching example of the resistor 50 in the vehicle power supply device 1 according to the embodiment, the target resistor 50 is switched every predetermined time. Thereby, while operating the function as the resistor 50, the temperature of the switching element corresponding to the target resistor 50 is managed below the predetermined temperature lower than the rated temperature. Therefore, it is possible to avoid failure of the switching element corresponding to the target resistor 50.

2-3. Second Switching Example of Resistor

In the first switching example of the resistor 50 described above, the target resistor 50 is switched every predetermined time. On the other hand, according to the second switching example of the resistor 50, the target resistor 50 is switched based on the temperature of the switching element corresponding to the target resistor 50. Specifically, each of the first switching element 21, the third switching element 23, and the fifth switching element 25 is provided with a temperature sensor (not shown) capable of measuring temperature. In this case, the control device 100 is connected to the temperature sensor and acquires the information of the temperature sensor. A temperature waveform acquired by the temperature sensor is shown, for example, as in case (B) of FIG. 4.

As shown in case (B) of FIG. 4, the waveform of the temperature state acquired by the temperature sensor provided in the first switching element 21 is represented by the first temperature waveform 111, the waveform of the temperature state acquired by the temperature sensor provided in the third switching element 23 is represented by the third temperature waveform 113, and the waveform of the temperature state acquired by the temperature sensor provided in the fifth switching element 25 is represented by the fifth temperature waveform 115.

Here, consider switching the target resistor 50 in order of the first resistor 50A, the second resistor 50B, and the third resistor 50C. First, the control device 100 sets the target resistor 50 to the first resistor 50A. In this case, as shown in case (B) of FIG. 4, the temperature indicated by the first temperature waveform 111 increases. At this time, both the third switching element 23 and the fifth switching element 25 are in a non-operating state, so the temperatures indicated by the third temperature waveform 113 and the fifth temperature waveform 115 are both maintained at about room temperature.

Subsequently, as shown in case (B) of FIG. 4, when the temperature indicated by the first temperature waveform 111 reaches or exceeds a predetermined temperature, the control device 100 changes the target resistor 50 from the first resistor 50A to the second resistor 50B. After switching the target resistor 50 to the second resistor 50B, the temperature shown in the first temperature waveform 111 decreases because the first switching element 21 switches from the operating state to the non-operating state. On the other hand, since the third switching element 23 switches from the non-operating state to the operating state, the temperature indicated by the third temperature waveform 113 rises. Since the fifth switching element 25 is in a non-operating state, the temperature indicated by the fifth temperature waveform 115 is maintained at about room temperature. In addition, the predetermined temperature is set to a temperature lower than the rated temperature.

Furthermore, as shown in case (B) of FIG. 4, after the target resistor 50 is switched to the second resistor 50B, when the temperature indicated by the third temperature waveform 113 becomes equal to or higher than a predetermined temperature, the control device 100, the target resistor 50 is switched from the second resistor 50B to the third resistor 50C. After switching the target resistor 50 to the third resistor 50C, the third switching element 23 switches from the operating state to the non-operating state, so the temperature shown in the third temperature waveform 113 decreases. On the other hand, since the fifth switching element 25 switches from the non-operating state to the operating state, the temperature indicated by the fifth temperature waveform 115 rises. Since the first switching element 21 remains in the non-operating state, the temperature indicated by the first temperature waveform 111 further decreases and returns to about room temperature.

Thereafter, the operation of switching the target resistor 50 in order of the first resistor 50A, the second resistor 50B, and the third resistor 50C is repeatedly performed. After that, when the voltage abnormality is resolved, the control device 100 cuts off the connection between the second inverter 20 and the resistor 50.

The temperature sensors may be provided in the second switching element 22, the fourth switching element 24 and the sixth switching element 26 instead of the first switching element 21, the third switching element 23 and the fifth switching element 25. Also, the temperature sensor may be provided in the resistor 50 instead of the switching element. In this case, the temperature of the switching element may be estimated based on the temperature of resistor 50. Further, the predetermined temperature used for switching determination of the target resistor 50 may be the same for the positive switching element and the negative switching element, or may be different.

Thus, in the second switching example of the resistor 50 in the vehicle power supply device 1 according to the embodiment, the target resistor 50 is switched based on the temperature of the switching element corresponding to the target resistor 50. Thereby, while operating the function as the resistor 50, the temperature of the switching element corresponding to the target resistor 50 is managed below the predetermined temperature lower than the rated temperature. Therefore, it is possible to avoid failure of the switching element corresponding to the target resistor 50.

As an example of switching the target resistor 50, the first example of switching and the second example of switching may be combined. For example, the control device 100 switches the target resistor 50 when a predetermined condition is satisfied. The predetermined conditions include at least one of a first condition that the time during which one resistor 50 of the plurality of resistors 50 is enabled is equal to or greater than a predetermined time, and a second condition that the temperature of the switching element obtained by the temperature sensor is equal to or greater than a predetermined temperature.

A first processing example corresponding to the first switching example of the resistor 50 and a second processing example corresponding to the second switching example of the resistor 50 will be described below.

3. Processing Example

3-1. First Processing Example

Figure 5:
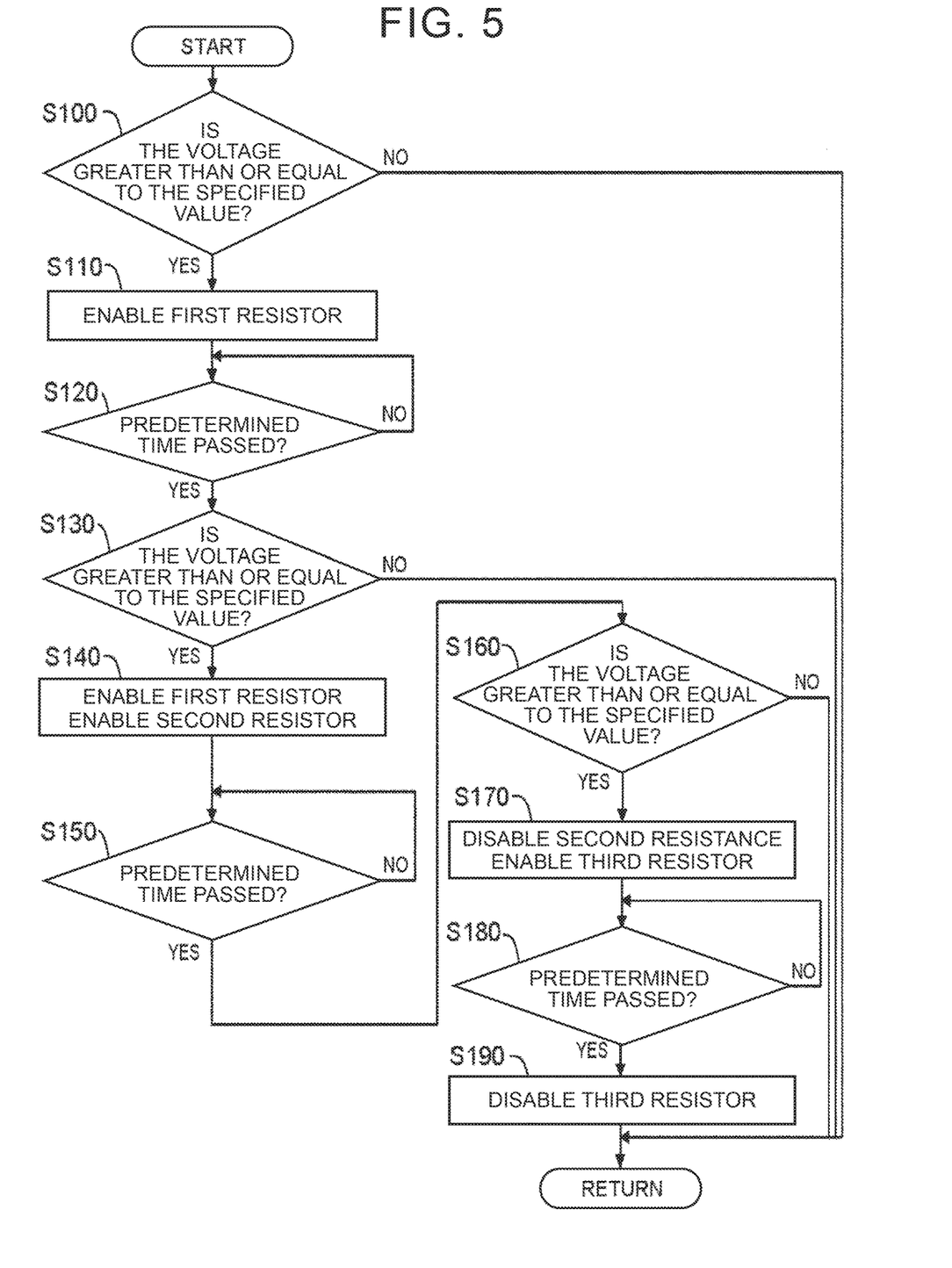
FIG. 5 is a flowchart showing a first processing example of the vehicle power supply device according to the embodiment.

FIG. 5 is a flowchart showing a first processing example of the vehicle power supply device 1 according to the embodiment.

In S100, the control device 100 determines whether the voltage value acquired by the voltage sensor is equal to or greater than a predetermined value. If it is determined that the voltage value is equal to or greater than the predetermined value (S100; Yes), the process proceeds to S110. Otherwise (S100; No), the process ends.

In S110, the control device 100 enables the first resistor 50A among the plurality of resistors 50 whose initial state is disabled as the target resistor 50. After that, the process proceeds to S120.

In S120, the control device 100 determines whether a predetermined time or more has passed since the first resistor 50A was enabled. If it is determined that the predetermined time or longer has passed since the first resistor 50A was enabled (S120; Yes), the process proceeds to S130. Otherwise (S120; No), the process returns to S120.

In S130, the control device 100 determines whether the voltage value acquired by the voltage sensor is equal to or greater than a predetermined value. If it is determined that the voltage value is equal to or greater than the predetermined value (S130; Yes), the process proceeds to S140. Otherwise (S130; No), the process ends.

In S140, the control device 100 disables the first resistor 50A and enables the second resistor 50B. That is, the control device 100 switches the target resistor 50 from the first resistor 50A to the second resistor 50B. After that, the process proceeds to S150.

In S150, the control device 100 determines whether a predetermined time or more has passed since the second resistor 50B was enabled. If it is determined that the predetermined time or longer has passed since the second resistor 50B was activated (S150; Yes), the process proceeds to S160. Otherwise (S150; No), the process returns to S150.

In S160, the control device 100 determines whether the voltage value acquired by the voltage sensor is equal to or greater than a predetermined value. If it is determined that the voltage value is equal to or greater than the predetermined value (S160; Yes), the process proceeds to S170. Otherwise (S160; No), the process ends.

In S170, the control device 100 disables the second resistor 50B and enables the third resistor 50C. That is, the control device 100 switches the target resistor 50 from the second resistor 50B to the third resistor 50C. Thereafter, the process proceeds to S180.

In S180, the control device 100 determines whether a predetermined time or more has elapsed since the third resistor 50C was enabled. If it is determined that the predetermined time or longer has passed since the third resistor 50C was activated (S180; Yes), the process proceeds to S190. Otherwise (S180; No), the process returns to S180.

At S190, the control device 100 disables the third resistor 50C.

3-2. Second Processing Example

Figure 6:
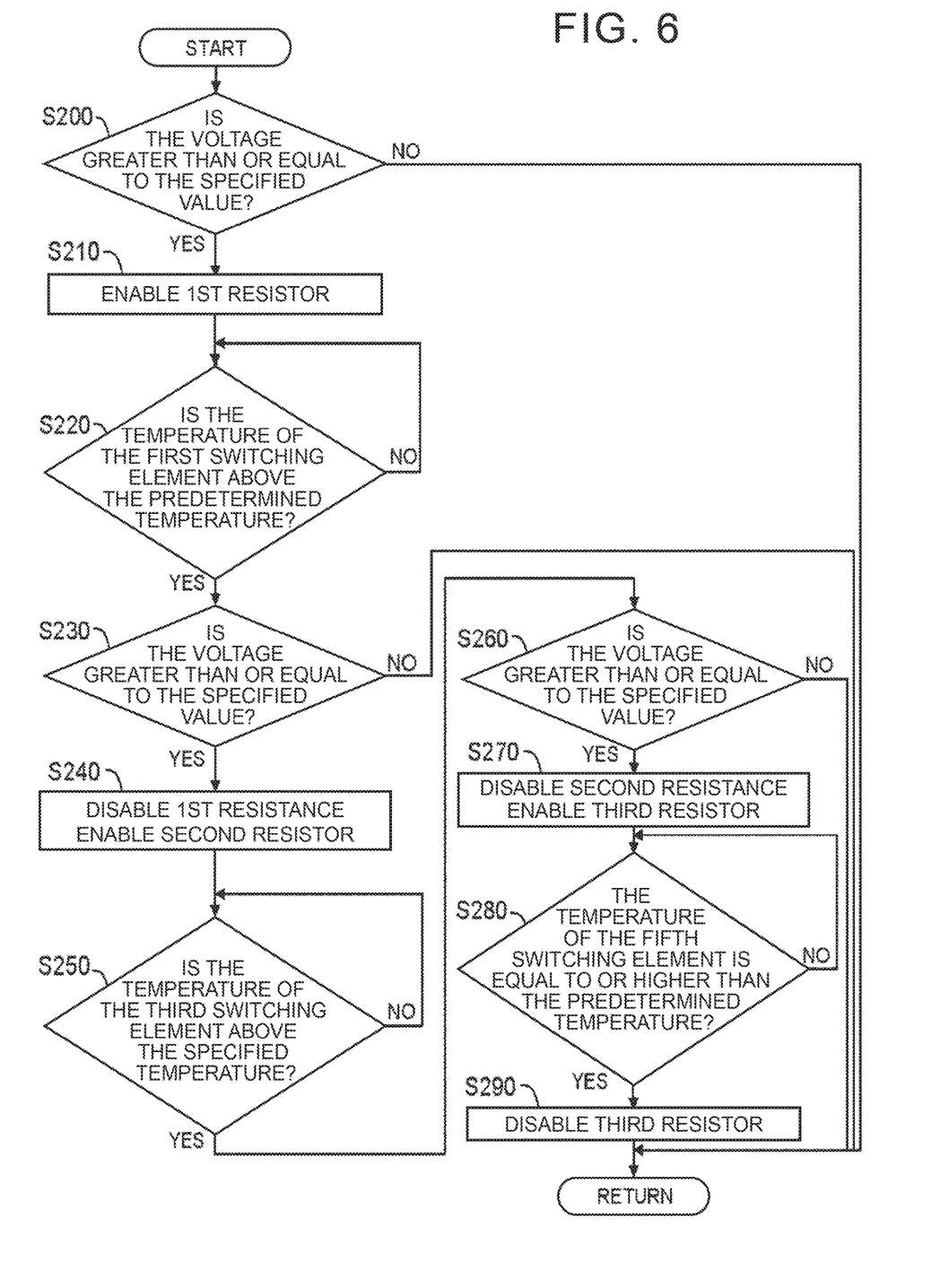
FIG. 6 is a flowchart showing a second processing example of the vehicle power supply device according to the embodiment.

FIG. 6 is a flowchart showing a second processing example of the vehicle power supply device 1 according to the embodiment. Here, processing different from the first processing example will be described, and description of processing that overlaps with the first processing example will be omitted. Specifically, S200, S210, S230, S240, S260, S270, and S290, which overlap with the first processing example, respectively correspond to S100, S110, S130, S140, S160, S170, and S190. Note that the processes different from the first process example are S220, S250, and S280, and the details of each process will be described later.

In S220, the control device 100 determines whether the temperature acquired by the temperature sensor provided in the first switching element 21 corresponding to the positive terminal (+) of the first resistor 50A, or the temperature sensor provided in the fourth switching element 24 corresponding to the negative terminal (−) of the first resistor 50A is equal to or higher than a predetermined temperature. If it is determined that the temperature is equal to or higher than the predetermined temperature (S220; Yes), the process proceeds to S230. Otherwise (S220; No), the process returns to S220.

In S250, the control device 100 determines whether the temperature acquired by the temperature sensor provided in the third switching element 23 corresponding to the positive terminal (+) of the second resistor 50B, or the temperature sensor provided in the sixth switching element 26 corresponding to the negative terminal (−) of the second resistor 50B is equal to or higher than a predetermined temperature. If it is determined that the temperature is equal to or higher than the predetermined temperature (S250; Yes), the process proceeds to S260. Otherwise (S250; No), the process returns to S250.

In S280, the control device 100 determines whether the temperature acquired by the temperature sensor provided in the fifth switching element 25 corresponding to the positive terminal (+) of the third resistor 50C, or the temperature sensor provided in the second switching element 22 corresponding to the negative terminal (−) of the third resistor 50C is equal to or higher than a predetermined temperature. If it is determined that the temperature is equal to or higher than the predetermined temperature (S280; Yes), the process proceeds to S290. Otherwise (S280; No), the process returns to S280.

What is claimed is:

1. A vehicle power supply device comprising a power control unit and a plurality of resistors connected to the power control unit, wherein:
    the power control unit includes
        a capacitor,
        a voltage sensor configured to measure a voltage of the capacitor,
        a three-phase inverter connected in parallel with the capacitor, and
        a control device connected to the voltage sensor and the three-phase inverter;
    a positive terminal of each of the resistors is connected to a positive power line via any one of a plurality of positive switching elements provided on a positive side of individual phases of the three-phase inverter;
    a negative terminal of each of the resistors is connected to a negative power line via any one of a plurality of negative switching elements provided on a negative side of the individual phases of the three-phase inverter;
    the negative terminal is connected to the negative power line via the negative switching element of one of two phases different from a phase in which the positive switching element connected to the positive terminal is provided; and
    the control device is configured to
        turn ON both the positive switching element and the negative switching element associated with one resistor out of the plurality of resistors disabled in an initial state to enable the one resistor when a voltage value of the voltage sensor is equal to or larger than a predetermined value, and
        disable the one resistor and turn ON both the positive switching element and the negative switching element associated with one other resistor out of the plurality of resistors to enable the one other resistor when a predetermined condition is satisfied.

2. The vehicle power supply device according to claim 1, wherein the predetermined condition is that a period during which the one resistor is enabled is equal to or longer than a predetermined period.

3. The vehicle power supply device according to claim 1, further comprising a temperature sensor configured to measure a temperature of each of the positive switching elements or the resistors, wherein:
    the control device is further connected to the temperature sensor; and
    the predetermined condition includes at least one of a condition that a period during which the one resistor is enabled is equal to or longer than a predetermined period and a condition that the temperature is equal to or higher than a predetermined temperature.

4. The vehicle power supply device according to claim 1, wherein:
    the control device is connected to each of the positive switching elements and each of the negative switching elements;
    the resistors include
        a first resistor connected to a first positive switching element provided in a first phase and a second negative switching element provided in a second phase,
        a second resistor connected to a second positive switching element provided in the second phase and a third negative switching element provided in a third phase, and a third resistor connected to a third positive switching element provided in the third phase and a first negative switching element provided in the first phase; and the control device is configured to
- turn ON the first positive switching element and the second negative switching element when enabling the first resistor,
- turn ON the second positive switching element and the third negative switching element when enabling the second resistor, and
- turn ON the third positive switching element and the first negative switching element when enabling the third resistor.

5. A vehicle power supply method comprising:

turning ON both a positive switching element and a negative switching element associated with one resistor out of a plurality of resistors disabled in an initial state and connected to a power control unit to enable the one resistor when a voltage value of a capacitor of the power control unit is equal to or larger than a predetermined value; and disabling the one resistor and turning ON both a positive switching element and a negative switching element associated with one other resistor out of the plurality of resistors to enable the one other resistor based on a predetermined condition.

* * * * *